Feb. 3, 1953 — H. R. NILSSON ET AL — 2,627,162
ELASTIC FLUID POWER PLANT
Filed May 18, 1948 — 2 SHEETS—SHEET 1
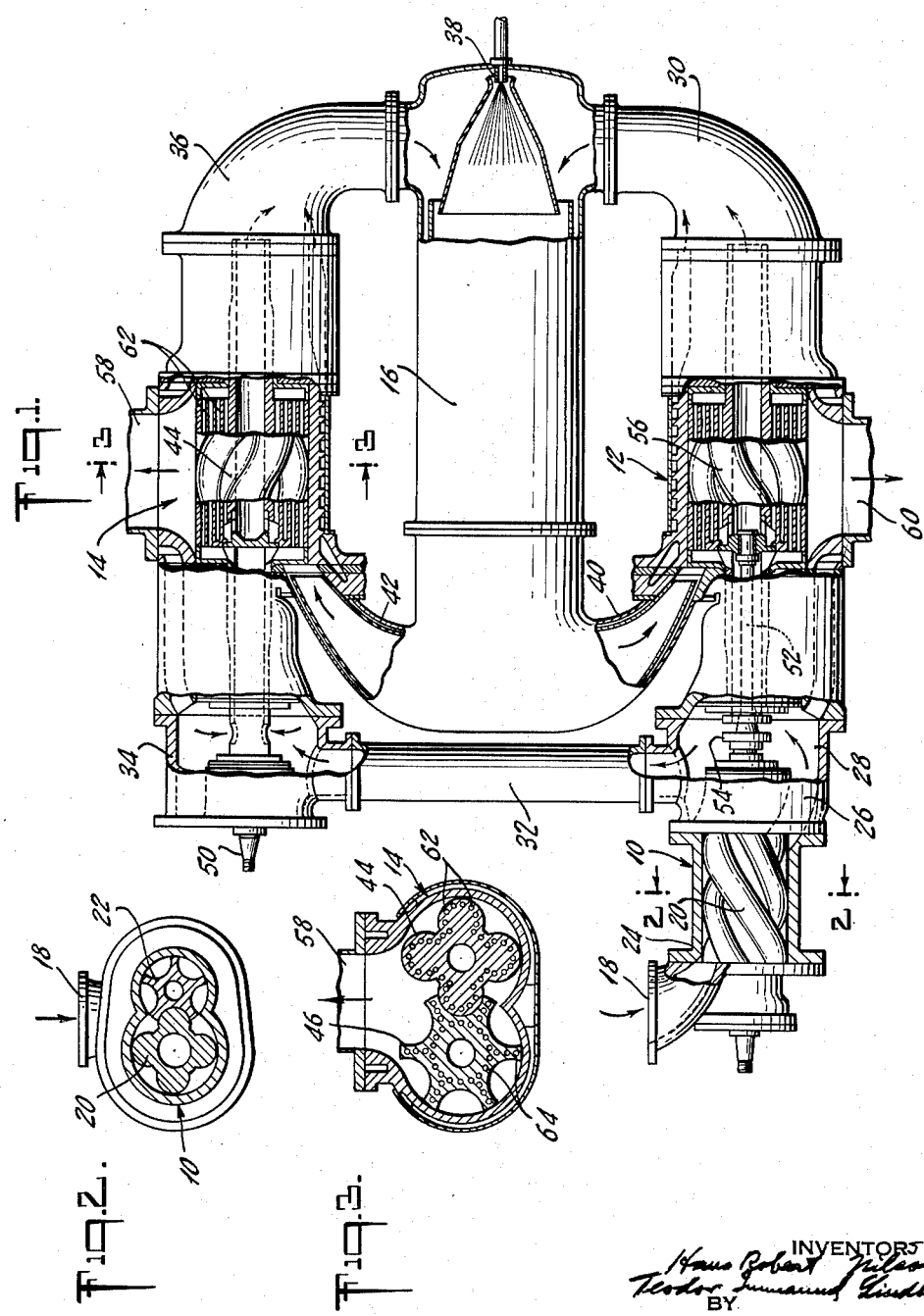

Feb. 3, 1953 H. R. NILSSON ET AL 2,627,162
ELASTIC FLUID POWER PLANT
Filed May 18, 1948 2 SHEETS—SHEET 2
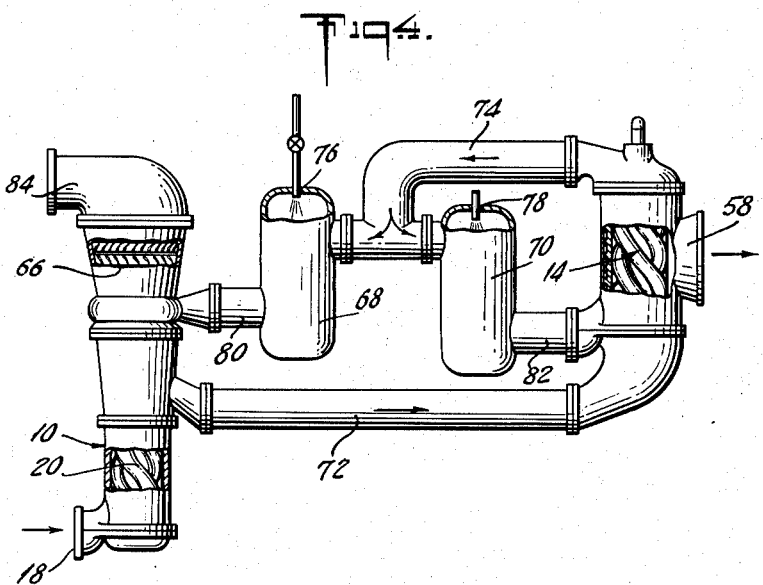
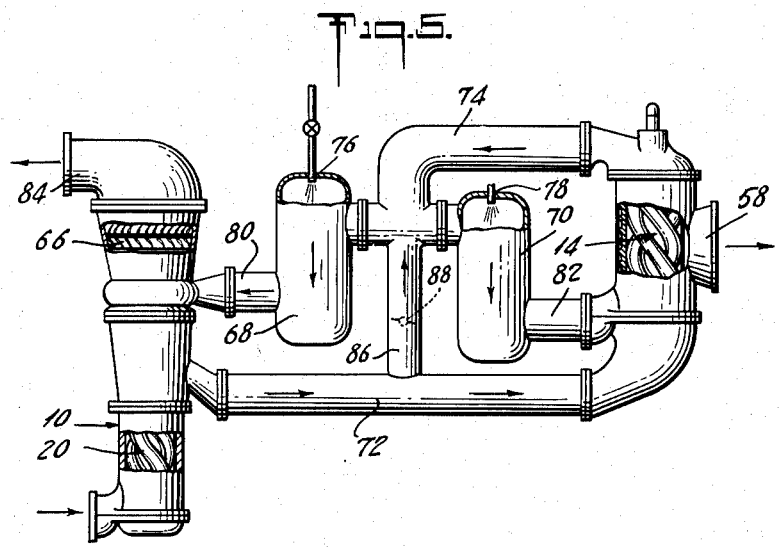
INVENTORS
Hans Robert Nilsson
Tenker Immanuel Lindhagen
BY
ATTORNEY Patented Feb. 3, 1953

2,627,162

UNITED STATES PATENT OFFICE 2,627,162

ELASTIC FLUID POWER PLANT

Hans Robert Nilsson and Teodor Immanuel Lindhagen, Stockholm, Sweden, assignors, by mesne assignments, to Jarvis C. Marble, New York, N. Y., Leslie M. Merrill, Westfield, N. J., and Percy H. Batten, Racine, Wis., trustees Application May 18, 1948, Serial No. 27,766
In Sweden May 22, 1947

10 Claims. (Cl. 60—39.15)

The present invention relates to elastic fluid power plants and has particular reference to plants adapted to carry variable loads at varying speeds, such as are required for traction purposes, as for example the propulsion of rail and road vehicles, operation of oil well drilling and logging rings, power shovels and similar uses.

The general object of the invention is the provision of a new type of power plant in which the component parts are organized in relationship resulting in what is in effect a new cycle of operation capable of highly efficient thermodynamic performance and in special designs also inherently productive of the characteristics required to handle traction loads demanding the production of high values of torque at stall or slow speed with decreasing torque demand as speed increases, while at the same time calling for the application of maximum power or tractive effort to the load irrespective of speed.

In order to effect the above mentioned objects and other and more detailed objects hereinafter appearing, the invention contemplates the provision of an elastic fluid actuated system in which the motive fluid for operating the system is generated by heating a gaseous medium compressed in one or more feeder units comprising a part of the system as a feeder section and in which the portion of the energy of motive fluid produced and not required for the operation of the feeder section is used to develop useful power, for instance by operating one or more power motors for carrying the external load on the system.

In the following the invention will be described for the special case that the feeder section is feeding one or more power motors of the positive displacement type, which for the sake of convenience will be hereinafter termed "power motors."

By utilizing power motors of the positive displacement type and by setting the conduits conveying working medium to the driving engines of the feeder section and to the power motors are in open communication with one another so that with decreasing speed of the motors of the power section the resultant diminished flow of working medium through said section produces an increased supply of working medium to the driving engines of the feeder section resulting in increased pressure of the working medium and thereby increasing the torque developed by the power section.

Decreasing speed of the power section, consisting of one or more motors, from a constant level of operation results in a diminished flow of motive fluid through the power section, until at stall no motive fluid passes through the power section, apart from leakage. This change in operation results in an increased quantity of the motive fluid to the motors of the feeder section, and, consequently, in an automatic increase of the pressure of the motive fluid in the system. An increased pressure thus acts upon the working surfaces of the power motor, thereby giving an increased torque to the external load. In other words, the power motor in the system shows a torque characteristic that has its maximum at stall and falls with increasing speed of the motor.

The invention will be hereinafter described more in detail with reference to the accompanying drawings illustrating by way of example certain embodiments thereof, and in which:

Fig. 1 shows, partly in section, one embodiment of the system of the invention where not only the power motor but also the compressor and the compressor driving engine consist of positive displacement machines.

Fig. 2 is a section of the compressor along the line 2—2 and Fig. 3 a section of the power motor along the line 3—3, both of Fig. 1.

Fig. 4 shows on a smaller scale an embodiment similar to that of Fig. 1 but having the driving engine of the compressor in the form of a turbine and the combustion chamber divided into two parts, one part for the power motor and the other for the compressor turbine.

Fig. 5 shows an embodiment similar to that of Fig. 4, a branch conduit being provided for supplying part of the compressed air directly to the combustion chambers bypassing the cooling system of the power motor.

The plant shown in Fig. 1 comprises as its main parts a compressor 10 for compression of the gaseous working medium, a driving engine 12, connected to said compressor, a power motor 14 for producing useful power developed by the plant, and a combustion chamber 16 where the necessary working medium is produced by combustion of a suitable fuel, generally liquid or gaseous, in the gaseous working medium compressed by the compressor, this medium, as a rule, being air. A number of pipes or ducts, necessary for the distribution of air and gas, complete the system.

Air is sucked into the compressor 10 through an air intake 18, compressed between the lobes of the rotors 20 and 22 and the compressor casing 24 and leaves the compressor through its outlet 26 opening into a distributing chamber 28 directly communicating with the exhaust end of the compressor casing. From this distributing chamber 28 part of the compressed air is conducted through the cooling system of the driving engine 12, directly connected to said chamber 28, and then to the combustion chamber 16 through conduit 30. The rest of the air is led through conduit 32 into a distributing chamber 34 at one of the ends of the power engine 14, whence it passes through said power motor and through conduit 36 also into combustion chamber 16.

In combustion chamber 16 a suitable quantity of fuel, for instance oil, is injected through the nozzles 38 and is burnt, after which the hot working medium thus produced is conducted in part to the compressor motor 12 and in part to the power motor 14 through the conduits 40, 42, respectively. When the gas expands between the rotors 44 and 46 and the casing of power motor 14 the thermal energy of the gas is converted into mechanical energy, which is utilized through an output shaft 50.

The compressor motor in the illustrated embodiment being of the same design as the power motor the energy, in this case, is also converted in the manner described with reference to the power motor and the power developed by the compressor motor is transmitted to the compressor through a shaft 52 and coupling 54. In the illustrated system the shaft between the two machines is connected to the rotors 20 and 56.

The expanded gas leaves the power motor through the exhaust 58 and the compressor motor through exhaust 60 and may escape either directly into the atmosphere or may first pass through a regenerator (not shown) and there transfer part of its heat content to the compressed air, before the latter is led to the combustion chamber 16. As already mentioned above, the compressed air on its passage to the combustion chamber 16 passes through the cooling system of the motors 12 and 14. As indicated in the figure, one of the functions of the air is to cool the rotors and the casing in the respective motors. For this purpose, the air is distributed from the respective distribution chambers 28 and 34 to the cooling systems of the rotors and the casing and is supplied at the opposite sides of the motors to the two conduits 30 and 36 respectively. The cooling thus obtained permits a high temperature of the working medium and thus a high output per unit weight of air as well as high thermal efficiency is obtained.

A more detailed description of the compressor and the construction of the motors regarding a suitable design of the rotors, of the inlet and outlets ports as well as of the cooling system is set out in the specification of our co-pending patent application Ser. No. 776,928. For the purpose of cooling, the rotors are provided with cooling channels 62 and 64 (Figs. 1 and 3), preferably running along the rotor lands.

It should here be pointed out that the compressor may be of any suitable type, such as a displacement or dynamic compressor, and that the driving engine 12 need not necessarily be of the displacement type, but may equally be for instance a gas turbine of impulse or reaction type of suitable design. The power motor, however, must be of displacement type in order to produce the special operating characteristics aimed at by this invention.

The main difference between the embodiment shown in Fig. 4 and the embodiment described above is that the motor of the compressor 10 comprises a gas turbine 66 and that two combustion chambers 68 and 70 are substituted for the common combustion chamber 16 described in the preceding embodiment for the purpose of providing an adjustment of the temperature of the working medium to a temperature suitable for the respective motor according to its resistance. This system operates as follows.

Air is sucked into the compressor 10 through its inlet 18 and is compressed as previously described. The compressed air is led through conduit 72 to the power motor 14, passes through the cooling system of the power motor so as to cool its working surfaces and is led through conduit 74 which branches into two combustion chambers 68 and 70. In these combustion chambers the compressed air is heated by the combustion of suitable liquid or gaseous fuel injected through the nozzles 76, 78 and converted into motive fluid which finally is led through conduits 80 and 82 to the compressor turbine 66 and to the power motor 14 respectively. This motive fluid expands there with transformation of its heat energy content into mechanical work and escapes through outlet 84 or 58 to the atmosphere or to a heat exchanger.

It is, of course, not essential to allow the entire quantity of compressed air to pass through the cooling system of the power motor. As an alternative part of the air may be led directly to the combustion chambers through a branch pipe 86, Fig. 5. A valve 88 or the like is preferably located in the branch pipe 86 to control the amount of air flowing therethrough.

With a system arranged according to the invention it is possible to obtain a starting torque which is 5 or 6 times the normal operating torque. If in a system as described above the power motor of the displacement type is replaced by a turbine, a maximum torque multiplication can be obtained, under otherwise similar conditions, which is only 2 to 3 times the normal operating torque. If for any given case a torque multiplication of 2 to 3 times the normal operating torque is sufficient, this torque multiplication can be obtained according to the system of the invention at considerably lower costs and with higher efficiency than if the power motor comprised a turbine.

The invention is, of course, not limited to the systems described above, but may be modified in its details. For example, it is possible to use a common combustion chamber for the system described with reference to Figs. 4 and 5, at the same time, to lead part of the compressed air so as to mix the heated working medium supplied to the compressor turbine in order to produce different temperatures of the motive fluid supplied to said turbine and to the more efficiently cooled displacement type power motor.

We claim:

1. An elastic fluid operated power system comprising a power section having positive displacement rotary power engine means for initially expanding hot motive fluid produced in the system to generate net useful power, a feeder section mechanically independent of said power section as to speed of operation for supplying motive fluid for operating said power section, said feeder section comprising compressor means including rotary compressor means for compressing an elastic fluid medium for subsequent use as motive fluid in said power section and feeder engine means for driving said compressor means, heating means for converting compressed fluid from said feeder section to high temperature motive fluid, conduit means for supplying motive fluid from said heating means to said engine means, said power engine means and said feeder engine means being in open communication to receive motive fluid at substantially the same initial pressure, whereby reduction in speed of the power engine means due to increased load on the system and resultant decrease in consumption of motive fluid by the power section results in increased pressure of motive fluid supplied to both said power engine means and to said feeder engine means by said compressor means to thereby increase the torque developed by said power section engine means and increase the quantity of motive fluid available for expansion in said feeder section engine means, and conduit means for supplying compressed fluid from said compressor means to said heating means including passages in said power section engine means for cooling the latter by the flow of the compressed medium to said heating means regardless of the relative amounts of hot motive fluid consumed by the engines of the power and feeder sections of the system.

2. A system as set forth in claim 1 in which the last mentioned means includes a connection for flow of part of the compressed fluid from the feeder section to the heating means without flowing through said cooling passages of the power section engine.

3. A system as set forth in claim 2 including valve means for controlling flow through said connection.

4. A system as set forth in claim 1 in which said compressor means comprises a compressor of the positive displacement type for compressing said fluid medium to final pressure.

5. A system as set forth in claim 1 in which said feeder section comprises a positive displacement engine for initially expanding the motive fluid supplied to the feeder section.

6. A system as set forth in claim 5 in which the conduit means for supplying compressed fluid from said compressor means includes passages in said feeder section engine for cooling the latter.

7. A system as set forth in claim 1 in which said heating means comprises a heating chamber constituting a common source of supply of motive fluid for the engine means of both said power and said feeder sections.

8. A system as set forth in claim 1 in which said heating means comprises separate heating chambers having communicating inlets for supplying hot motive fluid at different temperatures to said power and said feeder sections respectively.

9. A system as set forth in claim 8 in which the engine means of said feeder section comprises a turbine.

10. An elastic fluid operated power system comprising a power section having a positive displacement, rotary power engine comprising rotors with working surfaces exposed to motive fluid for initially expanding hot motive fluid produced in the system to generate net useful power, a feeder section mechanically independent of said power section as to speed of operation for supplying motive fluid for operating said power section, said feeder section comprising compressor means including rotary compressor means for compressing an elastic fluid medium for subsequent use as motive fluid in said power section and feeder engine means for driving said compressor means, heating means for converting compressed fluid from said feeder section to high temperature motive fluid, conduit means for supplying motive fluid from said heating means to said engine means, said power engine means and said feeder engine means being in open communication to receive motive fluid at substantially the same initial pressure, whereby reduction in speed of the power engine means due to increased load on the system and resultant decrease in consumption of motive fluid by the power section results in increased pressure of motive fluid supplied to both said power engine means and to said feeder engine means by said compressor means to thereby increase the torque developed by said power section engine means and increase the quantity of motive fluid available for expansion in said feeder section engine means, and conduit means for supplying compressed fluid from said compressor means to said heating means including passages in said power section engine means for cooling the latter by the flow of the compressed medium to said heating means regardless of the relative amounts of hot motive fluid consumed by the engines of the power and feeder sections of the system, said passages comprising passages for flow of the cooling fluid through said rotors closely adjacent to said working surfaces.

HANS ROBERT NILSSON.
TEODOR IMMANUEL LINDHAGEN.

REFERENCES CITED

The following references are of record in the file of this patent:

UNITED STATES PATENTS

| Number | Name | Date |
|---|---|---|
| 2,244,467 | Lysholm | June 3, 1941 |
| 2,248,639 | Miksits | July 8, 1941 |
| 2,371,889 | Hermitte | Mar. 20, 1945 |
| 2,396,068 | Youngash | Mar. 5, 1946 |
| 2,487,514 | Boestad et al. | Nov. 8, 1949 |

FOREIGN PATENTS

| Number | Country | Date |
|---|---|---|
| 464,475 | Great Britain | Apr. 16, 1937 |
| 665,762 | Germany | Oct. 3, 1938 |
| 907,059 | France | June 11, 1945 |